E. F. PAWSAT.
AUXILIARY FOOT REST FOR MOTOR CYCLES OR THE LIKE.
APPLICATION FILED JUNE 16, 1914.
1,118,679.                                   Patented Nov. 24, 1914.
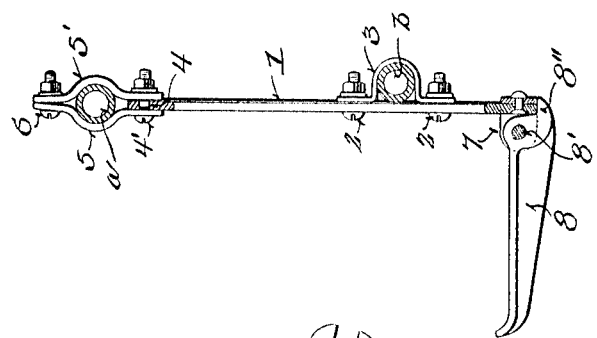
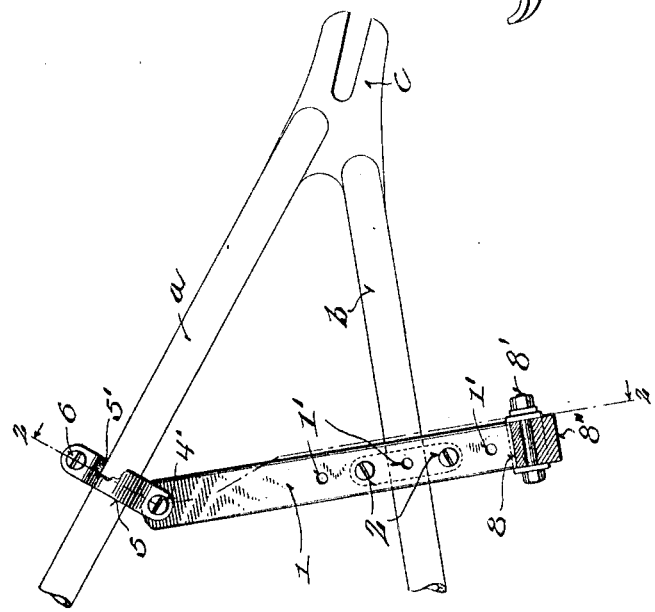

UNITED STATES PATENT OFFICE.

EWALD F. PAWSAT, OF SHEBOYGAN, WISCONSIN, ASSIGNOR TO WALD MANUFACTURING COMPANY, OF SHEBOYGAN, WISCONSIN.

AUXILIARY FOOT-REST FOR MOTOR-CYCLES OR THE LIKE.

1,118,679.      Specification of Letters Patent.      Patented Nov. 24, 1914.

Application filed June 16, 1914. Serial No. 845,435.

*To all whom it may concern:*

Be it known that I, EWALD F. PAWSAT, a citizen of the United States, and resident of Sheboygan, in the county of Sheboygan and State of Wisconsin, have invented certain new and useful Improvements in Auxiliary Foot-Rests for Motor-Cycles or the like; and I do hereby declare that the following is a full, clear, and exact description thereof.

My invention has for its object to provide a simple, economical and effective auxiliary rest attachment for motorcycles or like vehicles, the same being designed and arranged to be fitted to the bars of any type of motorcycle or like vehicle without cutting or fitting, to thus dispense with the services of a skilled mechanic in assemblage, the said rest being designed to be sold to the trade and attached by the purchaser. These rests are particularly in demand for use in attachment to motorcycles where it is desired to carry a passenger that is seated back of the driver's seat requiring a convenient footrest element.

With the above objects in view the invention consists in certain pecularities of construction and combination of parts as set forth hereinafter with reference to the accompanying drawings and subsequently claimed.

In the drawings Figure 1 represents a side elevation of a footrest attached to the members of a rear fork, the said rest embodying the features of my invention, and, as shown, is partly in section to more clearly illustrate structural features, and Fig. 2, a detailed cross-section of the same, the section being indicated by line 2—2 of Fig. 1.

Referring by characters to the drawings, *a* represents the upper bar of a rear fork and *b* the lower bar of the same, which bars are merged into a slotted axle-receiving foot *c*. These bars are obliquely disposed with relation to each other in the ordinary type of motorcycle frame and the angularity therebetween varies to a certain degree. Hence it is apparent that an auxiliary foot-rest to be attached thereto must be extremely flexible and at the same time adjustable to meet all requirements.

As best shown in Fig. 1, 1 represents a vertically disposed stirrup strap provided with a series of bolt-receiving apertures 1', a companion pair of which apertures are adapted to receive bolts 2, which bolts confine a clip 3 that is fitted over the lower fork member *b*. The upper end of the strap 1 terminates with an aperture 4 for the reception of a bolt 4', which bolt is arranged to confine clip members 5, 5', that are thus in swivel connection with the end of the strap. These clip members are adapted to overlap the upper bar *a* of the rear fork, as shown, and, owing to their swivel connection with the strap, they may readily be adjusted at right angles to said upper bar irrespective of its angularity, whereby the device is accurately fitted. Thus the strap is securely confined in connection with the lower bar *b* and also in connection with the upper bar *a* at a predetermined distance from the fork web, whereby the footrests are brought into their proper positions with relation to the rider. After the clips 5 have been adjusted over the bar *a* they are confined by a clamping bolt 6 which passes through apertures in the opposite ends of the clips to thus cause the same to be firmly clamped. Hence it will be observed that the strap is adjusted and locked with relation to the lower bar *b* at a right angle thereto, while the upper end of said strap is confined by the clip members 5, 5', which clip members are at a right angle to the upper bar *a*. The lower end of the strap 1 has riveted or otherwise secured thereto a clip 7 between the apertured ears of which is fitted the shank of a footrest 8, the said shank being mounted upon a pivot bolt 8', as shown. The rear end of the shank is formed with a projecting nose 8" which is adapted to abut the lower end of the strap 1 when said footrest is swung to its working position, it being apparent that when the footrest is not in use it can be folded upward against the strap so as not to form an obstruction.

While I have shown and described one of the footrests, it is obvious that they are attached in pairs and, owing to the simple construction shown, there are no rights and lefts required.

I claim:

1. The combination of a bicycle or motorcycle having a frame and rear forks provided with upper and lower bars obliquely disposed with relation to each other, a rest comprising a strap extending approximately at a right angle to the lower fork having a series of apertures in its lower end, a clip fitted over the rear fork member, means for attaching the clip, bolts carried by the clip for engagement with a predetermined pair of the strap apertures, and a pair of clip members in hinge connection with the upper end of said strap for engagement with the upper fork member.

2. The combination of a bicycle or motorcycle having a frame and rear forks provided with upper and lower bars obliquely disposed with relation to each other, an adjustable rest comprising a strap, means for adjustably securing the strap to the lower fork member, and a clip member in hinge connection with the upper end of the strap adapted to engage the upper fork bar.

In testimony that I claim the foregoing I have hereunto set my hand at Sheboygan in the county of Sheboygan and State of Wisconsin in the presence of two witnesses.

EWALD F. PAWSAT.

Witnesses:
WM. H. GRUBE,
ARTHUR A. NACK.